United States Patent [19]

Oetiker

[11] Patent Number: 5,111,555

[45] Date of Patent: May 12, 1992

[54] HIGH STRENGTH CLAMP STRUCTURE

[76] Inventor: Hans Oetiker, CH-8812, Horgen, Switzerland

[21] Appl. No.: 659,182

[22] Filed: Feb. 22, 1991

Related U.S. Application Data

[63] Continuation-in-part of Ser. No. 922,408, Oct. 23, 1986, which is a continuation of Ser. No. 622,764, Jun. 20, 1984, and a continuation-in-part of Ser. No. 567,085, Aug. 14, 1990.

[51] Int. Cl.⁵ .................................................. B65D 63/06
[52] U.S. Cl. .................................... 24/20 R; 24/20 CW
[58] Field of Search ............... 24/20 R, 20 CW, 23 R, 24/23 W, 20 EE, 23 EE, 22

[56] References Cited

U.S. PATENT DOCUMENTS

| | | | |
|---|---|---|---|
| 2,876,514 | 3/1959 | Murphy | 24/20 CW |
| 3,295,176 | 1/1967 | Bright | 24/20 CW |
| 3,455,336 | 7/1969 | Ellis | 24/16 PB |
| 3,789,463 | 2/1974 | Oetiker | 24/20 CW |
| 4,103,399 | 8/1978 | Oetiker | 24/22 |
| 4,222,155 | 9/1980 | Oetiker | 24/20 R |
| 4,308,648 | 1/1982 | Fay | 24/20 R |
| 4,312,101 | 1/1982 | Oetiker | 24/20 CW |
| 4,315,348 | 2/1982 | Oetiker | 24/20 CW |
| 4,430,775 | 2/1984 | Arthur | 24/20 CW |

FOREIGN PATENT DOCUMENTS 0783296  4/1968  Canada ........................... 24/20 CW

*Primary Examiner*—Victor N. Sakran
*Attorney, Agent, or Firm*—Paul M. Craig, Jr.

[57] ABSTRACT

A hose clamp with an ear-like structure which is adapted to be selected strengthened to achieve desired holding ability and/or re-tightening forces, as needed. This is achieved in one embodiment by complementary ear-like structures in the overlapping inner and outer band portions with the free ends of the inner and outer band portions connected with the corresponding overlapping, respectively, overlapped band portion. In addition or in the alternative, the ear-like structure is strengthened by external and/or internal strengthening members made of spring steel with predetermined spring characteristics whereby in one particular realization, the strengthening member can be readily installed and disassembled from the ear-like structure by the insertion and removal of pin-like retaining members.

42 Claims, 4 Drawing Sheets

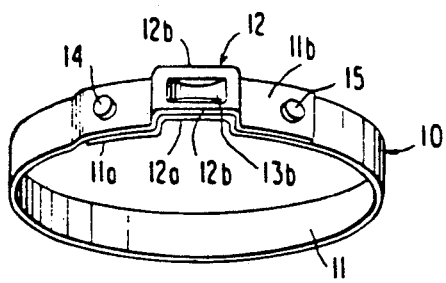
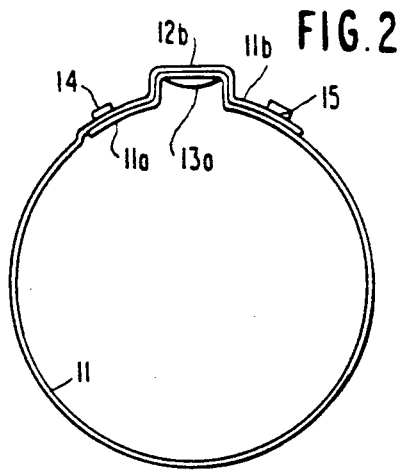
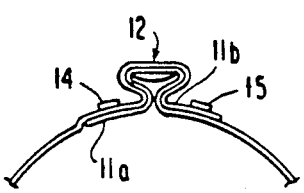
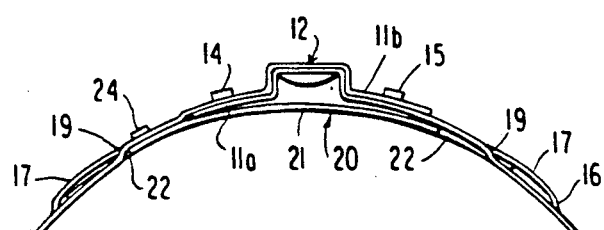
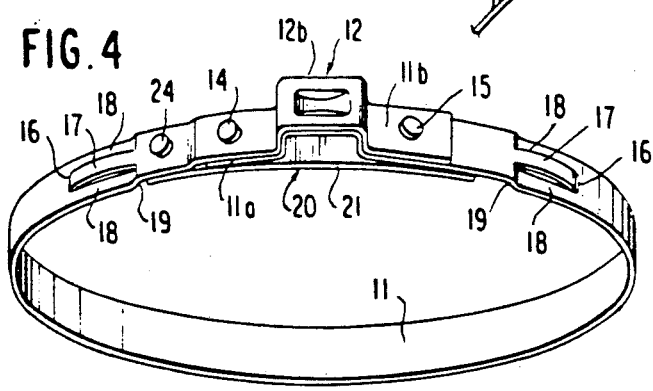
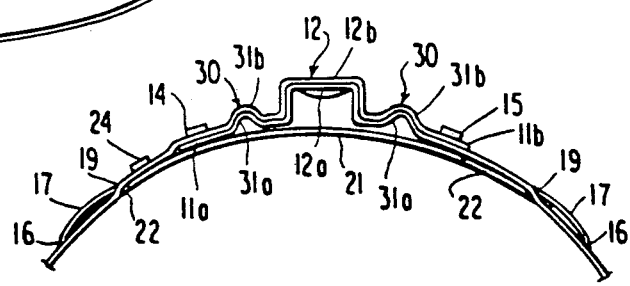
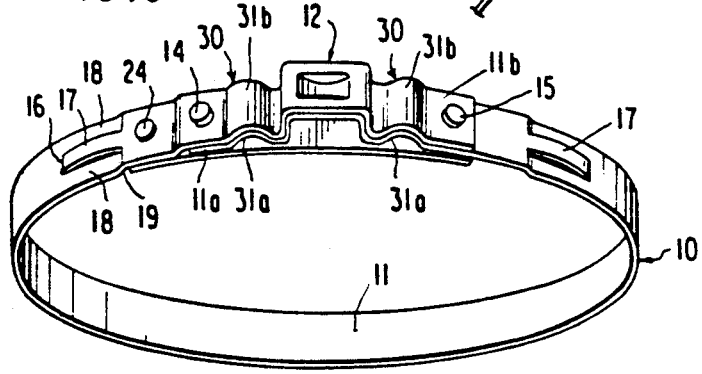

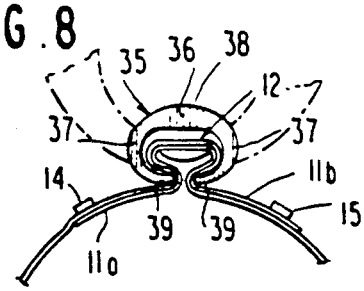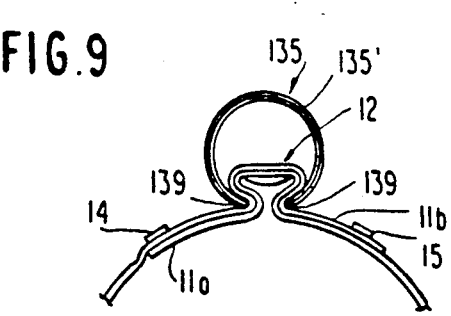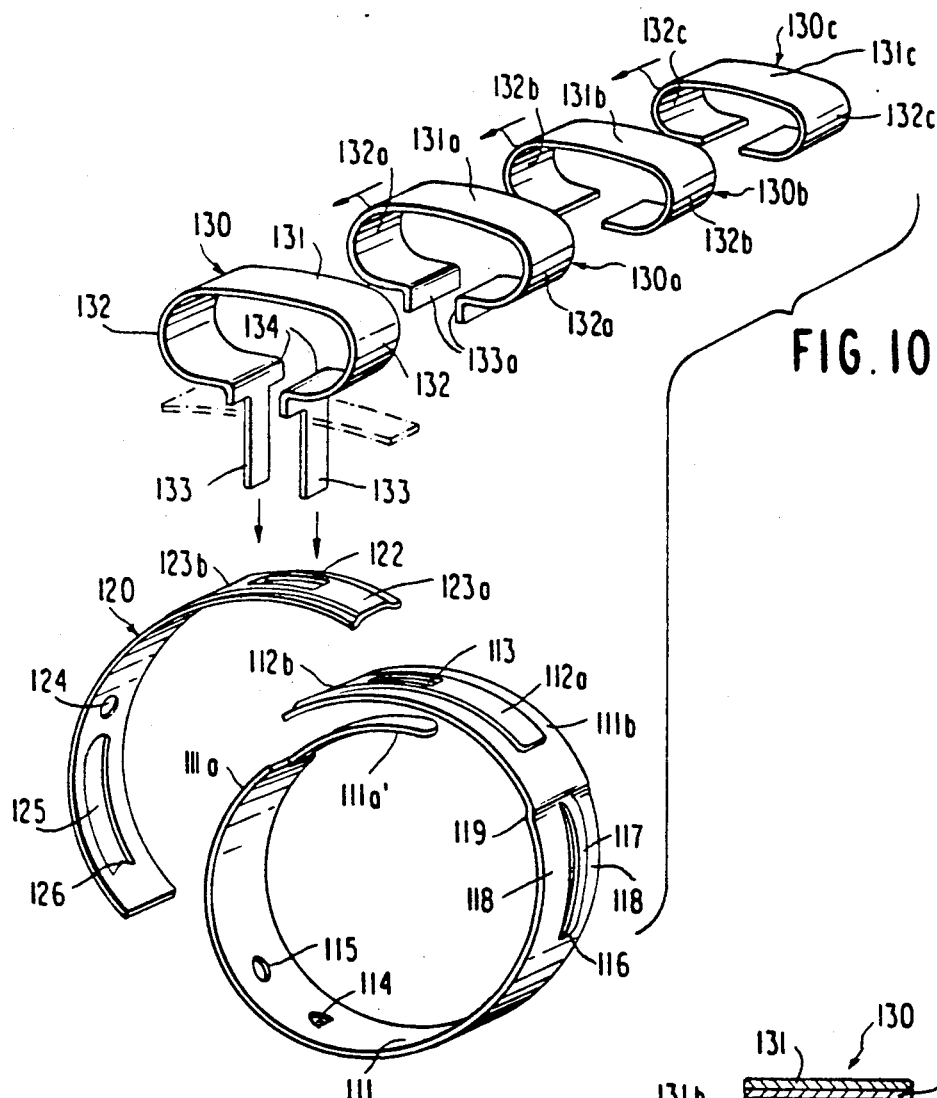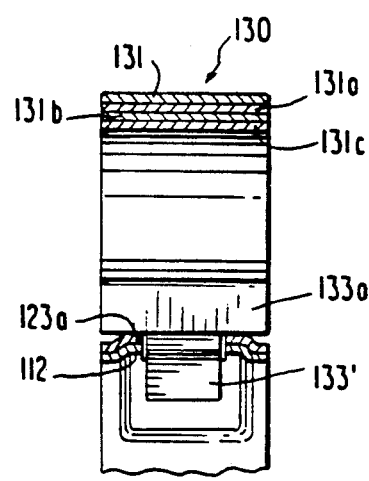

HIGH STRENGTH CLAMP STRUCTURE

RELATED CASES

This application is continuation-in-part application of my copending application Ser. No. 06/922,408, filed on Oct. 23, 1986, and entitled "Deformable Ear For Clamps", which itself is a continuation application of my then copending application Ser. No. 06/622,764, filed on Jun. 20, 1984 and entitled "Deformable Ear For Clamps" and also a continuation-in-part application of my copending application Ser. No. 07/567,085, filed on Aug. 14, 1990, and entitled "Externally Strengthened Clamp Structure."

FIELD OF INVENTION

The present invention relates to hose clamps with an ear-like structure which are strengthened to increase the holding ability thereof, and more particularly to ear-like structures internally and/or externally strengthened by the use of one or more strengthening members which have the shape more or less complementary to the ear-like structure.

BACKGROUND OF THE INVENTION

Various attempts have been made heretofore to strengthen ear-like structures of clamps, especially hose clamps, in order to increase their holding ability and/or their spring properties which determine the elastic re-tightening forces in case of expansion of the hose clamp due to temperature and/or pressure increases. For example, narrow reinforcing grooves of more or less canoe shape as viewed in plan view have been proposed in my prior U.S. Pat. No. 3,475,793 for the bridging portion of so-called "Oetiker" ears. My prior U.S. Pat. No. 3,510,918 proposed the use of an elastic insert member to control the elastic properties of the ear. A plug made from rod-shaped elastic material or hollow spring steel was also proposed in my prior U.S. Pat. No. 3,579,754. Considerable improvements for increasing the holding ability of ear-like structures were attained with a reinforcing depression provided in the bridging portion of the ear-like structure, as more fully disclosed in my aforementioned copending application Ser. No. 06/922,408, the subject matter of which is incorporated herein and has been published in my corresponding British Patent 2,160,577. According to this application, the reinforcing depression is a relatively shallow, generally pan-shaped depression of generally rectangular shape as seen in plan view with the sides extending over substantial portions of the width and length of the bridging portion in its non-reinforced condition. Though the various ways of increasing the holding ability of ear-like structures and/or controlling the elasticity thereof, as proposed heretofore by me, have proved very successful, the advent of new hose materials and/or applications to ever-greater ranges of temperature and/or pressure changes demand ever-improved characteristics in hose clamps. Proposals have also been made heretofore by others to address these and other problems. For example, the U.S. Pat. No. 3,087,221 proposed a hose clamp which had its greatest radial band thickness near the middle with the thickness progressively reduced towards the ends for the avowed purpose to maintain a true circle initially and upon change of diameter. In FIG. 3 of this patent, the ear itself was also proposed to be made in the same manner as the clamping band, i.e., having its greatest thickness in the middle with reduced thickness toward the ends of the ear. Apart from a lack of disclosure of how the clamps as proposed in this patent could be realized in practice, this patent was concerned only with maintaining a true circular configuration of the parts in question.

The European Patent 0 208 598 discloses an arrangement for a clamp structure provided with an outwardly extending circular fold or loop in the clamping band in which the elasticity reserve is to be determined by a slotted sleeve surrounding the fold or loop. According to this patent, the outwardly extending fold or loop is to limit the elasticity reserve in a fold or loop of the type shown in FIG. 1 in my prior U.S. Pat. No. 3,475,793 in which bent-out lugs or folds constitute tensional spring elements.

Another approach to affecting the holding ability of a so-called "Oetiker" ear can be found in my prior Swiss Patent 580,247 in which the plastically deformed ear can be subjected only to a predetermined maximum reopening force. However, the force for reopening the ear up to its maximum limit is unaffected by this arrangement.

The more recently issued U.S. Pat. No. 4,430,775 proposed a banding strap for attaching a heat shield to a muffler in which the overlapping band portions were provided with outwardly projecting folds so constructed and arranged that the fold in the inner band is received in the bite of the fold in the outer band. The inner and outer bands are held in position by a "snap-in" feature preventing the folds from springing apart before they can be crimped together. Furthermore, lateral misalignment is intended to be prevented by dimples which also add material strength and stiffness to the central sections of the folds. However, tests have indicated that the nesting arrangement of the folds as disclosed in this patent will not, as such, materially strengthen the fold's holding ability over that in a hose clamp with a similar fold but constituted only in the outer band portion, i.e., by a single band layer.

SUMMARY OF THE INVENTION

It is a principal object of the present invention to provide an ear-like structure in hose clamps which offers greatly improved holding characteristics.

Another object of the present invention resides in a hose clamp with an ear-like structure in which not only the holding ability but also the re-tightening spring characteristics can be accurately controlled in accordance with the requirements of a given situation.

A further object of the present invention resides in an ear-like structure for hose clamps which can be selectively modified as to its strength and spring characteristics by extraordinarily simple means.

Still another object of the present invention resides in a hose clamp with an ear-like structure whose holding strength and re-tightening capabilities ca be vastly increased so as to enable use with hoses subject to large breathing due to internal temperature and/or pressure changes.

According to one embodiment of the present invention, the inner and outer band portions are provided each with an ear-like structure of complementary shape and so arranged that the ear-like structure in the inner band portion is able to engage from within the ear-like structure in the outer overlapping band portion, whereby at least the inner band end portion is connected with the overlapping outer band portion and preferably also the outer band end portion is connected with the overlapped inner band portion by any known type of connection.

According to another feature of the present invention, the hose clamp with a double-layer ear-like structure can be made stepless along its internal clamping surface by the use of an insert member provided at each end with a tongue-like extension adapted to engage into a tongue-receiving channel provided in both the inner and outer band portions. The insert member is thereby additionally connected with the outer band portion by any known type of connection.

In another embodiment according to the present invention, the stepless clamp described above in accordance with the present invention is further improved by the use of sections imparting elastic stretchability to the clamping band. According to the present invention, these sections are constituted by undulations or corrugations both in the inner and outer band portion and of complementary shape so that the section or sections in the inner band portion can engage in nested relationship in the complementary section or sections in the outer band portion. Preferably, such sections are provided to both sides of the ear-like structure.

In order to be able to further controllingly increase the holding ability and/or re-tightening forces of the ear-like structure in a hose clamp of the type described above, the present invention provides in a still further modified embodiment an external strengthening member whose main portion has a thickness that is a multiple of the band thickness and whose tapering lateral portions engage with the inner ends of the ear-like structure.

In another embodiment of the present invention, two or more spring-like members of steel are used which are slipped over the plastically deformed ear to affect holding and spring characteristics of the ear-like structure in a controlled manner.

According to another feature of the present invention, a stepless clamp can be obtained whose ear-like structures can be readily controlled by the insertion of one or more strengthening members into the ear-like structure which is so connected with the clamping band that an expansion of the hose clamp due to an increase in temperature and/or pressure will seek to close the gap underneath the ear-like structure. The internal strengthening member or members thereby oppose such movement of the ear-like structure.

According to still another feature of the present invention, the ear-like structure is so constructed and arranged in conjunction with pin-like retaining members that the strengthening member can be readily assembled into the ear-like structure and disassembled therefrom whereby removal of the pin-like retaining member is realized by merely compressing the ear-like structure.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a perspective view of one embodiment of a hose clamp in accordance with the present invention having a strengthened ear-like structure with the parts thereof shown in the non-tightened condition of the ear-like structure;

FIG. 2 is an axial elevational view of the hose clamp of FIG. 1;

FIG. 3 is a partial axial elevational view, similar to FIG. 2, with the ear-like structure plastically deformed in the installed condition and illustrating a preferred arrangement of the free ends of the inner and outer band end portions in accordance with the present invention;

FIG. 4 is a perspective view, similar to FIG. 1, of a modified embodiment of a hose clamp with a strengthened ear-like structure in accordance with the present invention and providing a stepless internal clamping surface, with the parts thereof shown in the condition prior to plastic deformation of the ear-like structure;

FIG. 5 is an axial elevational view of the clamp of FIG. 4;

FIG. 6 is a perspective view, similar to FIG. 4, of a still further modified embodiment of a hose clamp with a strengthened ear-like structure in accordance with the present invention in which elastic stretchability is imparted to the clamping band;

FIG. 7 is a partial axial elevational view of the embodiment of FIG. 6;

FIG. 8 is a partial axial elevational view of still another embodiment of a hose clamp with a strengthened ear-like structure in accordance with the present invention in which the double ear-like structure of FIGS. 1-3 is further strengthened by an external strengthening member;

FIG. 9 is a partial elevational view, similar to FIG. 8, in which the plastically deformed ear-like structure is strengthened by two or more spring clamp members externally mounted over the plastically deformed ear-like structure;

FIG. 10 is an exploded perspective view of a further modified embodiment of a hose clamp in accordance with the present invention having a reinforced ear-like structure which can be selectively strengthened to meet the particular needs of a given situation;

FIG. 14 is a cross-sectional view, taken along line 14—14 of FIG. 12;

DETAILED DESCRIPTION OF THE DRAWINGS

Figure 11:
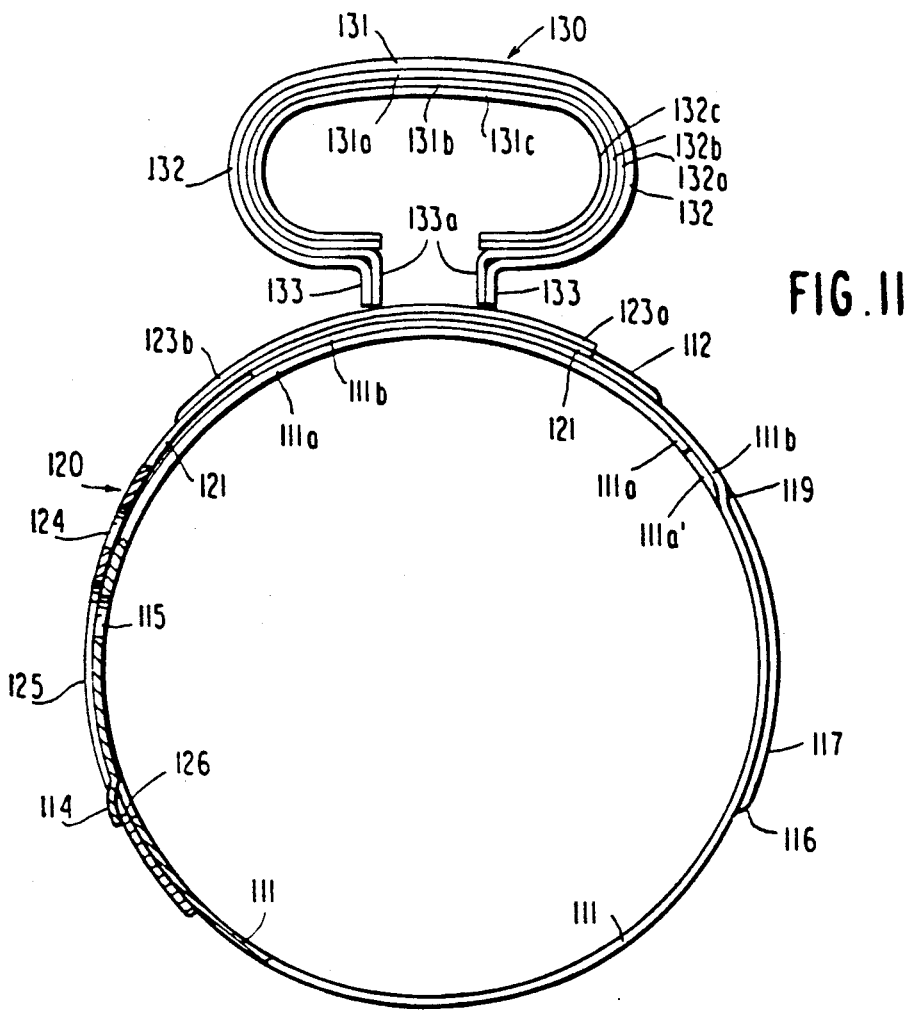
FIG. 11 is an axial elevational view, partly in cross section, of the assembled hose clamp of FIG. 10.

Referring now to the drawing wherein like reference numerals are used throughout the various views to designate like parts, and more particularly to FIGS. 1 and 2, reference numeral 10 designates therein a hose clamp in accordance with the present invention which includes a clamping band 11 made of any suitable material such as galvanized steel or stainless steel. The clamping band 11 is of such length in relation to the object to be fastened thereby, such as a hose, as to provide an overlap within the areas of the inner band end portion 11a and the outer band end portion 11b. The overlapping band portions 11a and 11b are provided with an ear-like structure generally designated by reference numeral 12 which consists of an ear-like structure 12a in the inner overlapped band portion 11a and an outer ear-like structure 12b in the overlapping outer band portion 11b. In a preferred embodiment, the ear-like structures 12a and 12b are so-called "Oetiker" ears which consist, as known, of generally outwardly extending leg portions interconnected by a bridging portion. The bridging portion of each ear-like structure 12a and 12b is thereby provided with a reinforcement, i.e., with reinforcement 13a in the bridging portion of the inner ear-like structure 12a (FIG. 2) and with reinforcement 13b in the outer ear-like structure 12b (FIG. 1) The ear-like structures 12a and 12b are thereby of complementary shape so that the inner ear-like structure 12a can engage into the outer ear-like structure 12b from within the hose clamp to provide a mutually nested relationship of these two ear-like structures 12a and 12b. The reinforcements 13a and 13b may be of any known construction but preferably are of the type described in my aforementioned copending application Ser. No. 06/922,408, according to which each of the reinforcements 13a and 13b is formed by a relatively shallow depression substantially rectangular in plan view with the length and width of a rectangular depression extending over substantial portions of the length and width of the respective bridging portion in its non-reinforced condition and at least over more than half the length and width. The bottom of the shallow depression is either relatively flat or curved with a relatively very large radius of curvature as described in the aforementioned copending application. As mentioned above, the structural details disclosed in the aforementioned copending application which are applicable to the reinforcements 13a and 13b in the bridging portions of the ear-like structures 12a and 12b of this invention are also disclosed in the corresponding already published British Patent 2,160,577.

The outer band portion 11b is connected with the inner band end portion 11a by way of a first connection 14 which may be of any known type, such as welding, riveting, inwardly or outwardly extending hooks of any known type engaging in corresponding apertures in the other band portion, or may also be of so-called "TOX" connections developed by the Tox Corporation. In a preferred embodiment of the present invention, the outer band end portion 11b is connected with the inner band portion by way of a second connection 15 which may also be of any conventional known type and is preferably similar to that of the first connection 14.

Tests with a band strap as disclosed in U.S. Pat. No. 4,430,775 have indicated that the holding ability with a fold consisting of two layers of band material did not significantly improve and in fact corresponded substantially only to a fold made from a single layer of band material. Similar results were obtained even when the outer band end portion was connected with the inner band portion, i.e., when only a connection corresponding to the connection 15 was provided. However, a surprising improvement with a double-band ear-like structure could be noticed when the inner band end portion was connected with the overlapping outer band portion, i.e., with the use of a connection corresponding to the first connection 14 of this invention. A still further substantial improvement in the holding ability of the ear-like structure and of the elastic retightening characteristics of the hose clamp were attainable by the use of both the first and second connections 14 and 15 in accordance with the present invention. Additionally, the arrangement as disclosed in the U.S. Pat. No. 4,430,775 revealed a strong tendency of disengagement of the band strap which would be totally unacceptable in hoses clamps. While the arrangement of U.S. Pat. No. 4,430,775 may well be adequate as a banding strap, according to the aforementioned test results, it would be unsuitable for use as a hose clamp or the like. The holding strength of the ear-like structure 12 in a hose clamp as shown in FIGS. 1 and 2 of the present invention increased by more than 75% of the maximum holding strength of a hose clamp made from the same material and with an arrangement as disclosed in the U.S. Pat. No. 4,430,775.

A further advantage obtainable with the present invention resides in the fact that, for example, riveted connections are not directly stressed during closing of the clamp by contraction of the so-called "Oetiker" ear because the clamping band material is extended twice over the ear-like structure. A simple riveted connection therefore suffices for the clamp structures in accordance with the present invention.

FIG. 3 illustrates a clamp structure such as shown in FIGS. 1 and 2 after plastic deformation of the ear-like structure 12 in which a cost-efficient and material saving arrangement is realized by relatively short band end portions 11a and 11b in conjunction with the so-called "TOX" system which eliminates the need for punching out band material normally required, for example, in connection with riveted connections.

Figure 12:
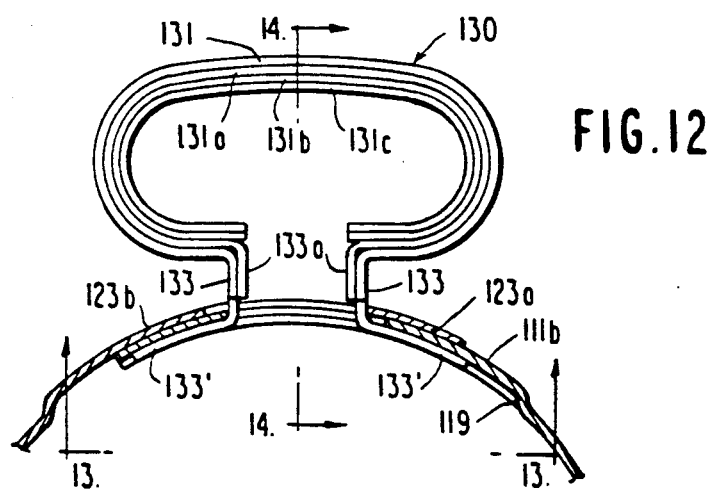
FIG. 12 is a partial axial view, partly in cross section, and illustrating the various parts of the hose clamp of FIG. 11 in the assembled condition.
Figure 13:
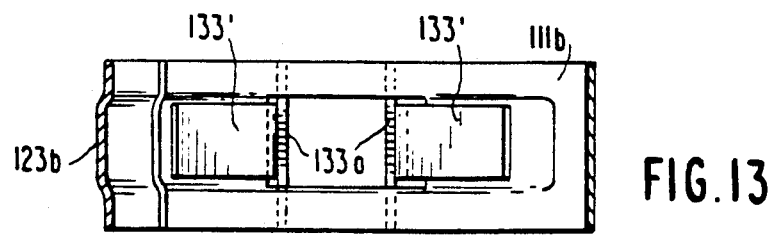
FIG. 13 is a bottom plan view of the hose clamp of FIG. 12, taken along line 13—13 in FIG. 12.
Figure 15:
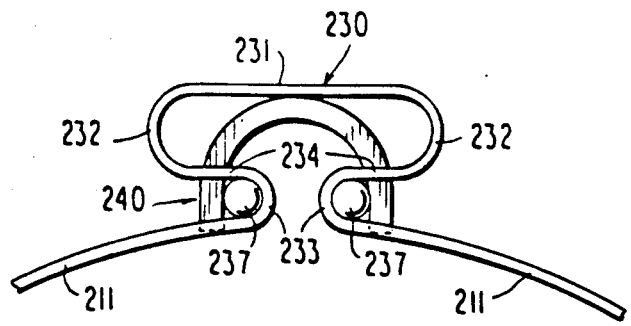
FIG. 15 is a partial axial elevational view through still another modified embodiment of a hose clamp with an internal strengthening member in accordance with the present invention which is removably connected with the ear-like structure by way of removable pin-like retaining members.
Figure 16:
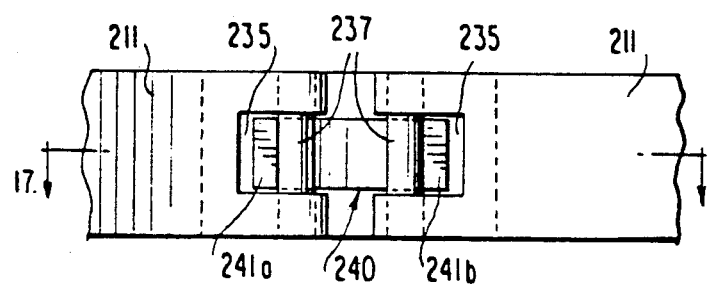
FIG. 16 is a bottom plan view on the hose clamp of FIG. 15.

FIGS. 4 and 5 illustrate a modified embodiment of a hose clamp as shown in FIGS. 1 and 2 in which with the use of an insert member generally designated by reference numeral 20 a gap-free stepless configuration of the inner clamping surface is achieved. The insert member 20 includes a main portion 21 provided at each free end with a tongue-like extension 22 which is adapted to engage in a tongue-receiving means formed by a pressed-out channel 17 in the center area of the outer band portion which leaves lateral non-pressed-out portions 18 on both sides thereof. The pressed-out central channel 17 thereby commences at a first step-like portion 19 raising the lateral portions 18 to the radial distance of the pressed-out channel 17 and terminates in a second step-like portion 16 located in the clamping band 11 from the first step-like portion 19 in a direction opposite the ear-like structure 12. As can be seen in FIGS. 4 and 5, tongue-receiving channels 17 are provided on both sides of the ear-like structure 12 in the inner and outer band portions 11a and 11b whereby the insert member 21 is connected with the outer band portion 11b at a further connection 24 which may be similar to the connections 14 and 15. The pressed-out channel portion 17 is thereby separated by one or several cuts from the lateral band portions 18. In lieu of the pressed-out channel portion 17, it is also possible to provide an aperture as shown, for example, in FIG. 12 of my prior U.S. Pat. No. 4,315,348. In the arrangement according to FIGS. 4 and 5, the gap underneath the ear-like structure 12 is bridged by the insert member 21 whereby the tongue-like extensions 22 in conjunction with the tongue-receiving means 16, 17, 18 and 19 avoid the formation of an steps due to overlap.

The embodiment of FIGS. 6 and 7 differs from the embodiment of FIGS. 4 and 5 in that sections generally designated by reference numeral 30 are provided in the inner and outer band portions 11a and 11b to impart elastic stretchability to the clamping band 11. The sections 30 are thereby in the form of complementary undulations or corrugations 31a and 31b, preferably on both sides of the ear-like structure 12 which are so arranged and constructed that an inner undulation or corrugation 31a is able to nest within a corresponding outer undulation or corrugation 31b. As a result of the sections 30, additional elastic stretchability is imparted to the clamping band which can be increased by the provision of several such undulations in each section. Furthermore, the sections 30 are not limited to undulations or corrugations but may also have shapes such as disclosed in my prior copending application Ser. No. 07/409,798, filed on Sep. 20, 1989 and entitled "Earless Clamp," in which elastic stretchability is imparted to the clamping band according to this copending application by one or more sections having non-linear lateral band portions symmetrically arranged with respect to the band center longitudinal plane and separated from each other by a centrally disposed opening which is in the shape resembling an hourglass.

FIG. 8 illustrates a still further modified embodiment in accordance with the present invention in which the double-band ear-like structure 12 is externally surrounded by a strengthening member generally designated by reference numeral 35. The strengthening member 35 includes a main portion 36 and two lateral portions 37 which are convexly curved and taper in the direction toward their free ends 39 that are preferably rounded-off with a radius of curvature smaller than the radius of curvature of the transition from the clamping band 11a, 11b into the leg portions of the so-called "Oetiker" ear 12 illustrated in FIG. 8 in its plastically deformed condition. The main portion 36 of the strengthening member 35 is thereby made of a thickness which is significantly greater than the thickness of the clamping band and also considerably greater than the thickness of the nested double layer of the clamping band and can be made thinner or thicker depending on the required strength for tensional forces expected in the clamping band 11. The internal surface of the main portion is thereby substantially rectilinear, passing over into the internal surfaces of the lateral portions 37 by way of rounded-off portions while the external surface 38 of the main portion 36 is preferably slightly convexly curved so that maximum thickness of the main portion 36 occurs near the middle thereof. However, the external surface 38 can also be made substantially parallel to the internal surface thereof.

The clamp structure shown in FIG. 8 is preferably tightened about an object to be fastened such as a hose, by applying a deformation force onto the lateral portions 37 which, in turn, will cause deformation of the plastically deformable ear-like structure 12 to assume its illustrated approximately omega shape typical for so-called "Oetiker" ears. The holding ability of the ear-like structure, already increased by the use of a double material layer can be further greatly increased by the presence of the external strengthening member 35 whose design is thereby so chosen that it does not totally eliminate the residual elasticity of the plastically deformed ear-like structure to compensate for changes in temperature and/or pressure. However, the ear-like structure can be readily adapted in its characteristics to the required or needed characteristics for holding ability, strength, etc. by selection of a correspondingly designed strengthening member 35. A pincer-like too with internal jaw surfaces matched to the curved external surface of the lateral portions 37 can be used for purposes of deforming the ear-like structure 12, 35.

FIG. 9 illustrates a modified embodiment of a clamp structure shown in FIGS. 1 and 2 of the present invention in which an extraordinarily favorable spring elasticity and retightening force can be achieved with the use of two or more spring clamps 135 which are made of spring steel. These spring clamps 135, which have a more or less part-circular shape, can be easily mounted over the plastically deformed ear-like structure 12, previously plastically deformed in the usual manner, by merely elastically opening up the clamp members 135 from their normal smaller configuration so that they can be slipped over the ear-like structure, respectively, another already installed clamp member 135. The end portion 139 of the clamp members 135 thereby have a shape at least approximately corresponding in its installed condition to the external shape of the inner leg portions of the plastically deformed ear-like structure 12 so that they can be mounted in a number depending on need, over the plastically deformed ear-like structure 12 to obtain the desired holding strength coupled with desired optimum re-tightening forces, which is important for use with hoses carrying a fluid subjected to temperature and/or pressure changes, for example, coolant hoses in internal combustion engines. The spring clamps 135 in accordance with the present invention, which can be readily mounted over the plastically deformed ear, will thus serve to solve numerous sealing problems in an extraordinarily simple manner. Additionally, depending on requirements, the possibility exists to attain with the use of the present invention of FIG. 9 a hose connection which will completely satisfy by simple means the needs of a given situation, i.e., be it a simple hose connection or a high pressure hose connection. Unlimited possibilities are thus attainable with the reinforced ear-like structure according to the present invention regardless of whether the clamping band is made of conventional steel having a tear strength of about 40 kg. per mm$^2$ or of stainless steel having a tear strength in excess of 100 kg. per mm$^2$. The use of the spring clamp members according to FIG. 9 therefore offers practically unlimited versatility in the connections attainable therewith, whereby the range can of course also be increased by the use of thicker band material.

The embodiment illustrated in FIGS. 10-14 represents a stepless clamp which offers a very high re-tightening force, necessary in particular with hose connections for strongly breathing hoses as a result of large temperature and pressure fluctuations within the hoses. The embodiment of FIGS. 10-14, in which similar reference numerals of the 100 series are used, includes a clamping band 111 whose inner and outer band end portions 111a and 111b are intended to overlap. To provide a stepless inner clamping surface, the inner band portion 111 is provided with a tongue-like extension 111a' adapted to engage in a pressed-out channel portion 117 located in the center of the outer band portion 111b and leaving again lateral portions 118 on each side of the channel portion 117. The pressed-out channel portion 117 which is separated from the lateral portions 118 by one or several cuts on each side, commences at a step-like portion 119 bringing the lateral portions 118 to the radial height of the channel portion 117, and terminates in a second step-like portion 116. Going in the direction from the step-like portion 119 toward the free end of the outer band portion 111b, the outer band portion 111b is provided with a central pressed-out embossment 112 adjoined by a rectangular opening 113 and with a further similar central pressed-out embossment 112b on the other side of the opening 113. The inner band portion 111a is provided, proceeding in a direction away from its tongue-like extension 111a', with a circular opening 115 followed by a cold-deformed pressed-out hook 114. A separate connecting member generally designated by reference numeral 120 connects the inner band portion with the ear-like structure and, proceeding from its right end in the counterclockwise direction in FIG. 10, is provided with a first central pressed-out embossment portion 123a followed by a rectangular opening 122 of substantially the same size as opening 113, in turn followed by a similar central pressed-out embossment portion 123b which is followed by a circular opening 124 and an elongated opening 125 having an arrow-shaped projection 12 for engagement in the pressed-out hook portion 114. The ear-like structure generally designated by reference numeral 130 which is of pre-shaped configuration and made from a material with preselected thickness and characteristics, includes a main portion 131 adjoined by approximately semi-circularly shaped lateral portions 132 which pass over into leg portions 133 by way of rounded-off portions 134. The leg portions 133 are thereby of a width smaller than the width of the openings 113 and 122 to permit extension therethrough and subsequent bending over into the position indicated in dash-and-dotted lines in FIG. 10. A number of strengthening spring elements 130a, 130b, 130c preferably of slightly decreasing size to permit easy installation in their nested arrangement within the ear-like structure 130 (FIG. 11) each includes a main portion 131a, 131b, 131c adjoined by approximately semi-circularly shaped lateral portions 132a, 132b and 132c. Only the first strengthening member 130a is thereby provided with short leg portions 133a while the other strengthening members 130b and 130c are without such leg portions in order not to reduce unnecessarily the remaining gap in the circumferential direction which might limit breathing of the hose. The strengthening spring elements 130a, 130b, 130c are of a shape complementary to the shape of the ear-like structure 130, 131, 132 such that they will elastically oppose, with predetermined strength, expansion of the hose clamp which seeks to move the leg portions 133 toward each other as a result of the particular arrangement shown in FIGS. 10-14. The elastic tightening forces produced by the hose clamp of FIGS. 10-14 can be selectively adjusted by the number of strengthening members used and thus permits the realization of a stepless hose clamp which offers very high holding strength and very high elastic retightening forces as may be required in some applications. Of course, the number of strengthening members may be chosen to suit the particular need which is also true of the material selection used for the ear-like structure 130 and the strengthening members 130a, 130b, 130c, etc.

Figure 17:
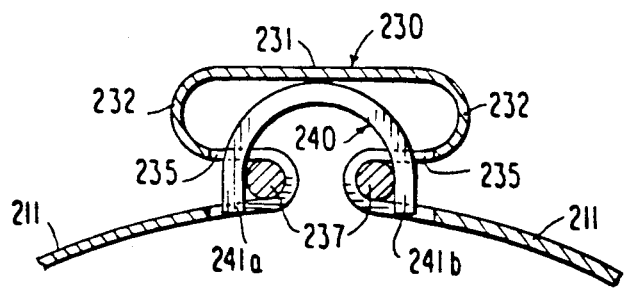
FIG. 17 is a cross-sectional view, taken along line 17—17 of FIG. 16.
Figure 18:
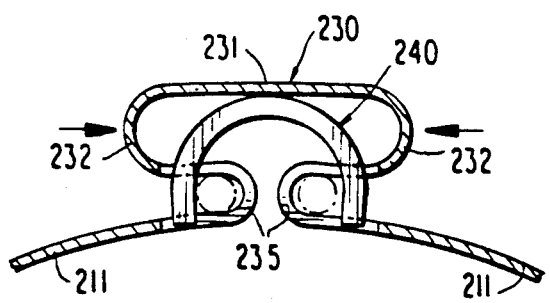
FIG. 18 is a cross-sectional view, similar to FIG. 17 in which the ear-like structure is compressed to permit removal of the pin-like retaining members.
Figure 19:
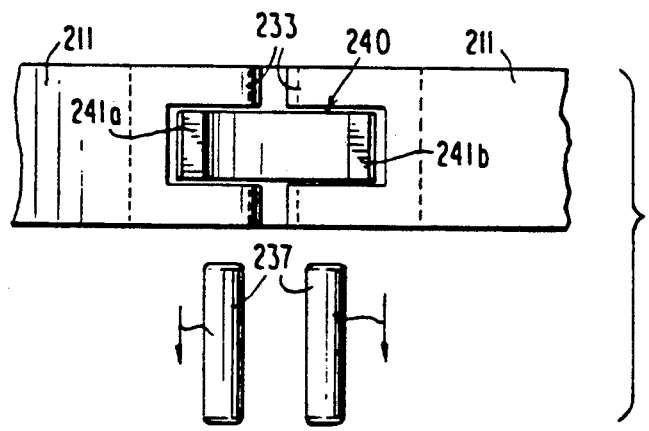
FIG. 19 is a bottom plan view on the arrangement of FIG. 18, also indicating the removed pin-like retaining members.

FIGS. 15-19 illustrate a still further embodiment in accordance with the present invention for a hose clamp with a readily interchangeable spring-like strengthening member in the ear-like structure. The hose clamp of this embodiment, of which only a part of the clamping band is shown and designated by reference numeral 211 includes an ear-like structure generally designated by reference numeral 230 which has a substantially rectilinear main portion 231 adjoined by at least approximately semi-circularly shaped lateral portions 232 terminating by way of end portions 234 in nearly semi-circularly shaped connecting portions 233 having a radius of curvature smaller than the radius of curvature of the lateral portions 232. The rounded-off connecting portions 233 thereby connect the nearly horizontally extending end portions 234 (FIG. 15) with the clamping band 211. The end portions 234 as well as the connecting portions 233 are thereby provided each with a central aperture 235 extending also a slight distance into the clamping band so that a strengthening member 240 of suitable spring material and approximately semi-circular shape can be installed through the openings 235 with its leg portions 241a and 241b extending into openings 235 as shown in FIG. 17. The strengthening member 240, which is made of appropriate thickness and suitable spring material, thereby exerts by its leg portions 241a and 241b forces on pin-like retaining members 237 and by way of the latter on the connecting portions 233 seeking to close the gap underneath the ear-like structure, i.e., seeking to tighten the hose clamp. The pin-like members 237 thereby extend through the space between the rounded-off connecting portions 233 and the leg portions 241a and 241b. The strengthening member 240 is of such shape that its leg portions 241a and 241b are spread apart from their normal position in the installed position thereof shown in FIG. 17, so that the strengthening member 240 will apply an elastic force increasing the strength of the ear-like structure 230 to oppose expansion of the hose clamp by opening of the gap underneath the ear-like structure 230. The strengthening member 240 thereby has a width less than the width of the openings 235 so that it can be easily removed from within the ear-like structure 230 after the pin-like members 237 are withdrawn. This can be easily done by applying oppositely directed force onto the lateral portions 232 as indicated by the arrows in FIG. 18 which will effectively increase the space between the leg portions 241a and 241b and the connecting portions 233 so that the pin-like members 237 can drop out, whereby the strengthening member 240 will also drop out as soon as the retaining pin-like members 237 are removed.

Thus, the embodiment of FIGS. 15-19 provides a hose clamp in which, in addition to the ear-like structure 230, an increased elastic tightening force can be achieved by the use of the strengthening member 240 made, for example, of appropriate spring steel. By merely compressing the ear-like structure 230, the two pin-like members 237 will drop out and for reassembly it is only necessary to insert the strengthening member 240 and thereafter again compress the ear-like structure 230 so as to be able to then reinsert the pin-like members 237.

While I have shown and described several embodiments in accordance with the present invention, it is understood that the same is not limited thereto but is susceptible of numerous changes and modifications as known to those skilled in the art. For example, the embodiments of FIGS. 1-7 are not limited to one ear structures, but the features disclosed are equally applicable to two-ear structures or multi-ear structures, possibly made from several parts, which are connected as shown, for example, in FIG. 27 of my prior U.S. Pat. No. 4,299,012 and which are then suitable for larger diameters and greater clamping ranges as well as greater expansion. Additionally, the present invention is not limited to so-called "Oetiker" ears, but is equally applicable to other clamp structures in which double-layered tightening means can be realized. Furthermore, the sections imparting elastic stretchability illustrated in FIGS. 6 and 7 may also be of any other configuration, for example, as disclosed in my copending application Ser. No. 07/446,729 entitled "Improved Hose Clamp" and filed on Dec. 6, 1989.

I therefore do not wish to be limited to the details shown and described herein but intend to cover all such changes and modifications as are encompassed by the scope of the appended claims.

I claim:

1. A hose clamp, comprising clamping band means with overlapping band portions, and means for tightening the clamp structure, said means for tightening the clamp structure including ear-like means in each of the overlapping band portions, said ear-like means being of complementary shape to enable to ear-like means to assume a nested relationship with the ear-like means in an inner band portion engaging from within the clamp into the ear-like means in an outer overlapping band portion, said first means within an area of the inner overlapped band portion following its ear-like means in the circumferential direction for connecting at least a free end portion of the inner overlapped band portion to the corresponding overlapping outer band portion.

2. A hose clamp according to claim 1, further comprising second means within an area of the outer overlapping band portion following its ear-like means in the circumferential direction for connecting the free end portion of the outer overlapping band portion to the corresponding overlapped inner overlapping band portion.

3. A hose clamp according to claim 2, wherein the first and second connecting means are located on opposite sides of the nested ear-like means.

4. A hose clamp according to claim 3, wherein each clamping band end portion is relatively short in the circumferential direction so as to minimize material waste, yet sufficiently long to accommodate a respective one of the connecting means.

5. A hose clamp according to claim 3, wherein each ear like means is plastically deformable and includes two outwardly extending leg portions interconnected by a bridging portion.

6. A hose clamp according to claim 5, wherein each bridging portion is provided with reinforcing means.

7. A hose clamp according to claim 6, wherein each reinforcing means is formed by a shallow, generally pan-shaped depression having a substantially rectangular configuration as viewed in plan view whose sides constituting the width and length of the rectangular configuration extend substantially rectilinearly over more than half the width, respectively, length of the bridging portion.

8. A hose clamp according to claim 6, comprising further means assuring a stepless, gap-free internal clamping surface.

9. A hose clamp according to claim 3, further comprising additional means in the overlapping band portions within an area excluding the ear-like means to impart elastic stretchability to the clamping band means in the band circumferential direction.

10. A hose clamp according to claim 9, wherein said additional means are formed by corrugation-like sections in the overlapping band portions of complementary shape to enable corresponding corrugation-like sections to assume a nested relationship with one another.

11. A hose clamp according to claim 9, wherein the overlapping band portions are provided with complementary additional means on both sides of the ear-like means.

12. A hose clamp according to claim 3, further comprising separate means for increasing the holding ability and elastic re-tightening forces of the ear-like means.

13. A hose clamp according to claim 12, wherein said separate means includes at least one external spring member of generally part-circular shape mounted over the ear-like means with the free ends of the spring member in engagement with the inner area of the leg portions of the ear-like means.

14. A hose clamp according to claim 13, wherein the curved configuration of the free ends of the spring member conform in the installed condition at least approximately to the curved configuration of the inner areas of the leg portions with the ear-like means in its deformed closed condition.

15. A hose clamp according to claim 13, wherein said separate means includes several generally part-circular steel spring members in mutually nested relationship mounted over the ear-like means.

16. A hose clamp according to claim 12, wherein the ear-like means have leg portions and wherein said separate means includes an external strengthening member having a main portion adjoined by curved lateral portions terminating in tapering end portions in engagement with the inner area of the leg portions.

17. A hose clamp according to claim 16, wherein the main portion has a thickness which is a multiple of the thickness of the clamping band means, wherein the inner surface of the main portion is at least approximately rectilinear and passes over into the inner surfaces of the lateral portions by way of curved portions.

18. A hose clamp according to claim 17, wherein the external surface of the main portion is convexly shaped having its greatest thickness in the center area.

19. A hose clamp, comprising clamping band means with overlapping band portions, and means for tightening the clamp structure, said means for tightening the clamp structure including ear-like means in each of the overlapping band portions, said ear-like means being of complementary shape to enable the ear-like means to assume a nested relationship with the ear-like means in an inner band portion engaging from within the clamp into the ear-like means in an outer overlapping band portion, first means for connecting at least a free end portion of the inner overlapped band portion to the corresponding overlapping outer band portion, second means for connecting the free end portion of the outer overlapping band portion to the corresponding overlapped inner overlapping band portion, the first and second connecting means being located on opposite sides of the nested ear-like means, each ear means being plastically deformable and including two outwardly extending leg portions interconnected by a bridging portion, each bridging portion being provided with reinforcing means, and further means assuring a stepless, gap-free internal clamping surface, said further means including an insert member internally covering the circumferential area of overlap of the overlapping inner and outer band portions and including tongue-like extensions at the free ends of the insert member, tongue-receiving means in the clamping band means for each of the tongue-like extensions, and said insert member being connected to the clamping band means.

20. A hose clamp according to claim 19, wherein said insert member is connected to a part of the clamping band means forming the outer band portion and on the side of the ear-like means opposite the free end of the outer band portion.

21. A hose clamp according to claim 20, wherein said tongue-receiving means includes a pressed-out channel extending in the clamping band circumferential direction within the central area thereof leaving on each side a lateral clamping band portion, and said pressed-out channel commencing within the area of a step-like portion displacing the lateral clamping band portions to the radial level of the channel.

22. A hose clamp according to claim 20, further comprising additional means in the overlapping band portions to impart elastic stretchability to the clamping band means in the band circumferential direction.

23. A hose clamp according to claim 22, wherein said additional mean are formed by corrugation-like sections in the overlapping band portions of complementary shape to enable corresponding corrugation-like sections to assume a nested relationship with one another.

24. A hose clamp according to claim 23, wherein the overlapping band portions are provided with complementary corrugation-like sections on both sides of the ear-like means.

25. A hose clamp according to claim 24, wherein each ear means is plastically deformable including two outwardly extending leg portions interconnected by a bridging portion.

26. A hose clamp comprising clamping band means, and ear-like means operatively associated with said clamping band means to enable elastic changes in the diametric dimensions of the hose clamp, said ear-like means forming a gap in the circumferential direction and being operable to change the gap underneath the ear-like means in the presence of forces seeking to enlarge the diametric dimensions of the clamp, and further means operatively associated with the ear-like means for selectively changing the spring characteristics of the ear-like means to adapt the same to existing requirements including spring-like means internal of the ear-like means and operable to strengthen the holding ability of the ear-like means so as to resist changes in the gap underneath the ear-like means brought about by internal forces seeking to expand the hose clamp and at the same time increase the re-tightening forces when the forces seeking to expand the hose clamp subside.

27. A hose clamp according to claim 26, wherein said further means is formed by at least one spring member substantially conforming to the internal configuration of the ear-like means.

28. A hose clamp according to claim 27, wherein a respective spring member is made from spring steel.

29. A hose clamp according to claim 26, wherein said ear-like means is of elongated fold-like configuration open in the direction of the clamping band means, and wherein each spring-like means also has a fold-like configuration complementary to that of the ear-like means such as to enable insertion into the ear-like means in nested relationship.

30. A hose clamp according to claim 29, wherein several spring-like means are provided one nested within the other.

31. A hose clamp according to claim 30, wherein a respective spring-like means is inserted with prestress.

32. A hose clamp according to claim 29, wherein the ear-like means includes leg portions forming the gap and connecting means so connecting the leg portions to the clamping band means that the gap is narrowed as the hose clamp seeks to expand.

33. A hose clamp according to claim 32, comprising still further means assuring a stepless, gap-free internal clamping surface.

34. A hose clamp with overlapping inner and outer clamping band portions according to claim 33, wherein said still further means includes a tongue-like extension at the end of the inner band portion and tongue-receiving means in the outer band portion, the inner band portion covering the area of the gap.

35. A hose clamp according to claim 34, wherein the tongue-receiving means includes a pressed-out channel extending in the clamping band circumferential direction within the central area thereof leaving on each side a lateral clamping band portion, and said pressed-out channel commencing within the area of a step-like portion displacing the lateral clamping band portions to the radial level of the channel.

36. A hose clamp according to claim 34, wherein said connecting means includes a separate connecting member operatively connecting the inner band portion with said ear-like means.

37. A hose clamp according to claim 29, wherein each of the ear-like means and spring means has a substantially rectilinear main portion adjoined by at least approximately semi-circular lateral portions terminating in end portions substantially parallel to the main portion.

38. A hose clamp according to claim 26, further comprising removable retaining means for securely retaining the spring-like means on the inside of the ear-like means.

39. A hose clamp according to claim 38, wherein said retaining means are pin-like members adapted to be removed by compression of the ear-like means.

40. A hose clamp according to claim 39, wherein said pin-like members are held fast between externally open, rounded-off connecting portions connecting the ear-like means with the clamping band means which partially surround the pin-like members on one side and the spring-like means engaging the pin-like members on the other side.

41. A hose clamp according to claim 40, wherein openings are provided in the connecting portions, and the width of said spring-like means is smaller than the width of the openings.

42. A hose clamp according to claim 41, wherein said spring-like means is of substantially U-shape with its free leg portions extending into the openings.

* * * * *